Sept. 17, 1963 L. E. McDUFF ETAL 3,103,789
DRAINAGE PIPE
Filed June 1, 1962
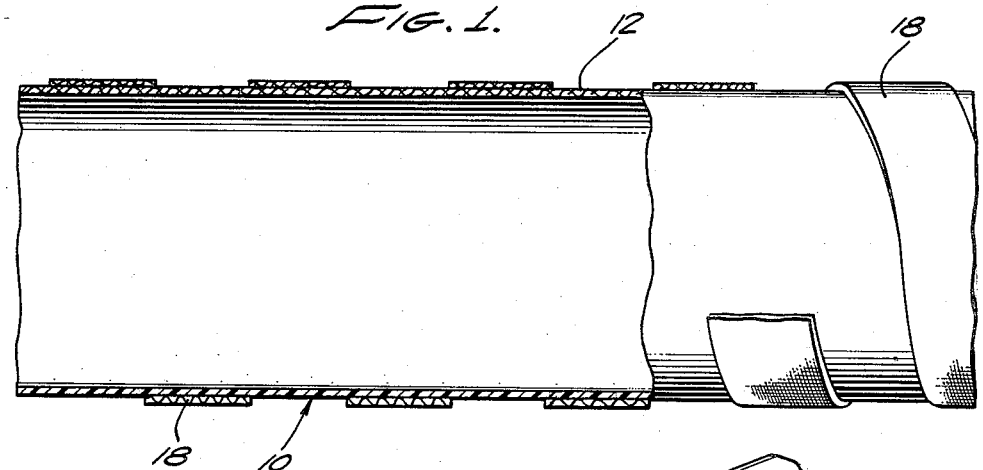
FIG. 1.
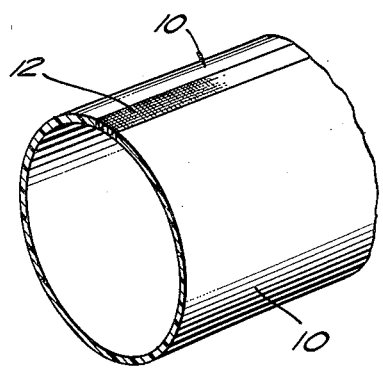
FIG. 3.
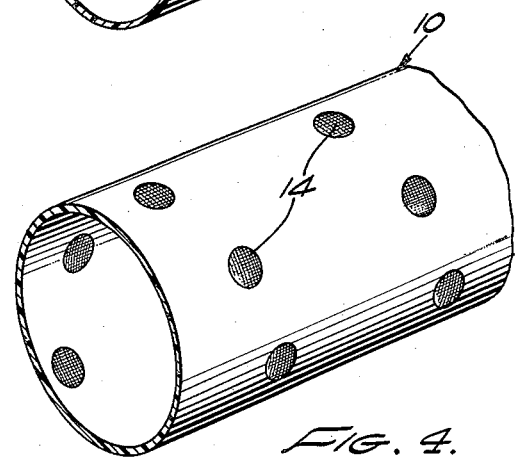
FIG. 2.
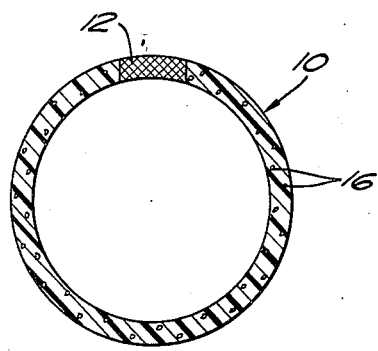
FIG. 5.
FIG. 4.
LEON E. McDUFF
JOHN J. ELMORE, JR.
INVENTORS
BY Lyon & Lyon
ATTORNEYS 3,103,789
DRAINAGE PIPE
Leon E. McDuff, Corona, and John J. Elmore, Jr., Brawley, Calif., assignors to Lidco, Inc., Brawley, Calif., a corporation of California
Filed June 1, 1962, Ser. No. 199,470
6 Claims. (Cl. 61—11)

This invention relates to an improved drainage pipe.

It is frequently desirable to provide means for draining off excess water from the undersurface of, for example, an agricultural field. In the past, lines of clay or concrete tile have been used for this purpose. However, such drains frequently fail due to plugging up or shifting of the earth during earthquakes, or for other reasons.

It is an object of this invention to provide a drainage pipe for subsurface drainage which is a continuous unit and thus eliminate many causes of failure of such pipe.

It is still a further object of this invention to provide a pipe having a durable filtering junction.

Still a further object of the invention is to provide a pipe wherein the filter may be closely controlled and inspected.

Other objects and advantages will be readily apparent from the following description.

In the drawings:

FIGURE 1 is a side elevation with part thereof broken away of one form of the invention.

FIGURE 2 is a perspective of one form of the pipe.

FIGURE 3 is a view similar to FIGURE 2 of a modified form of pipe.

FIGURE 4 is a view similar to FIGURE 2 of a further modified form of this invention.

FIGURE 5 is an end view of a further modification of the invention.

A pipe 10 is formed of a natural plastic such as coal-tar or of a foamed plastic such as urethene, epoxy, styrene, phenolic or the like, with a strip 12 of fiber glass batting molded either longitudinally in the form of FIGURE 2 or spirally in the form of FIGURE 3 the length thereof.

During the forming process, the plastic will penetrate the edge of the strip 12 and hold same firmly in place with sufficient area of the fiber glass filtering strip untouched by the plastic to permit free flow of water therethrough into the pipe while preventing dirt and the like from entering same.

The spiral form of strip provides flexibility permitting bending or curving of the pipe. The filtering material may be in the form of patches 14 as seen in FIGURE 4 instead of a strip and likewise may be of rock wool or open cell foamed plastic or other suitable filtering media preferably inert.

The pipe may be strengthened by inserting a suitable filler such as gravel 16 or other suitable material in the foamed plastic as seen in FIGURE 5 or by a spirally wound strip 18 of suitable material.

While what hereinbefore has been described as the preferred embodiment of this invention, it is readily apparent that modifications and alterations can be made without departing from the scope of the invention.

We claim:

1. A subsurface drainage pipe comprising: a plastic pipe having at least one void therein filled with a suitable filtering material bonded to the pipe.

2. A subsurface drainage pipe comprising: a foamed plastic pipe having at least one void therein filled with a suitable filtering material and bonded to the pipe.

3. A subsurface drainage pipe comprising: a foamed plastic pipe having at least one void therein, filled with a fiberglass molded to said pipe.

4. A subsurface drainage pipe comprising: a foamed plastic pipe having at least one void therein filled with a suitable filtering material and bonded to the pipe, said void constituting a longitudinal strip.

5. A subsurface drainage pipe comprising: a foamed plastic pipe having at least one void therein filled with a suitable filtering material and bonded to the pipe, said void constituting a spiral strip.

6. A subsurface drainage pipe comprising: a foamed plastic pipe having at least one void therein, a fiberglass matting filling said void with said plastic permeating a portion only of said matting.

References Cited in the file of this patent
UNITED STATES PATENTS

| Re. 16,994 | Cohn | June 12, 1928 |
| 679,131 | Thompson | July 23, 1901 |
| 1,894,295 | Scandore | Jan. 17, 1933 |
| 2,879,803 | Francois | Mar. 31, 1959 |
| 2,966,690 | Rochlin | Jan. 3, 1961 |